(12) United States Patent
Qiu et al.

(10) Patent No.: US 11,966,700 B2
(45) Date of Patent: Apr. 23, 2024

(54) NEURAL TAGGER WITH DEEP MULTI-LEVEL MODEL

(71) Applicant: Microsoft Technology Licensing, LLC, Redmond, WA (US)

(72) Inventors: Yuwei Qiu, Redmond, WA (US); Gonzalo Aniano Porcile, Redmond, WA (US); Yu Gan, Redmond, WA (US); Qin Iris Wang, Redmond, WA (US); Haichao Wei, Redmond, WA (US); Huiji Gao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 17/194,118

(22) Filed: Mar. 5, 2021

(65) Prior Publication Data

US 2022/0284191 A1  Sep. 8, 2022

(51) Int. Cl.
| | |
|---|---|
| G06F 40/295 | (2020.01) |
| G06F 16/953 | (2019.01) |
| G06F 40/35 | (2020.01) |
| G06N 3/045 | (2023.01) |
| G06N 3/08 | (2023.01) |

(52) U.S. Cl.
CPC .......... *G06F 40/295* (2020.01); *G06F 16/953* (2019.01); *G06F 40/35* (2020.01); *G06N 3/045* (2023.01); *G06N 3/08* (2013.01)

(58) Field of Classification Search
CPC ...... G06F 40/295; G06F 16/953; G06F 40/35; G06N 3/045; G06N 3/08
See application file for complete search history.

(56) References Cited

U.S. PATENT DOCUMENTS

| | | | |
|---|---|---|---|
| 2015/0032713 A1* | 1/2015 | Musgrove | G06F 16/81 |
| | | | 707/706 |
| 2017/0344352 A1* | 11/2017 | Peterson | G16B 30/00 |
| 2020/0356851 A1* | 11/2020 | Li | G06N 3/044 |
| 2021/0224977 A1* | 7/2021 | Jia | G06F 18/24 |
| 2021/0286989 A1* | 9/2021 | Zhong | G06F 40/177 |
| 2022/0036209 A1* | 2/2022 | Horesh | G06N 3/088 |

\* cited by examiner

*Primary Examiner* — Douglas Godbold
*Assistant Examiner* — Edward Tracy, Jr.
(74) *Attorney, Agent, or Firm* — NICHOLSON DE VOS WEBSTER & ELLIOTT LLP

(57) ABSTRACT

Embodiments of the described technologies are capable of reading a text sequence that include at least one word; extracting model input data from the text sequence, where the model input data includes, for each word of the text sequence, segment data and non-segment data; using a first machine learning model and at least one second machine learning model, generating, for each word of the text sequence, a multi-level feature set; outputting, by a third machine learning model, in response to input to the third machine learning model of the multi-level feature set, a tagged version of the text sequence; executing a search based at least in part on the tagged version of the text sequence.

19 Claims, 10 Drawing Sheets

NEURAL TAGGER WITH DEEP MULTI-LEVEL MODEL

TECHNICAL FIELD

A technical field to which the present disclosure relates is automated semantic tagging of text sequences. Another technical field to which the present disclosure relates is automated named entity recognition.

BACKGROUND

Semantic tagging refers to a type of natural language processing that is used to interpret the meaning of text. Named entity recognition is a particular type of semantic tagging in which entities are identified in unstructured text and assigned to pre-defined categories.

Statistical modeling approaches have been used to automate semantic tagging. Prior statistical modeling approaches compute probabilities of words belonging to particular semantic categories based on features of the individual words, independently of features of other words, and then select semantic tags for those words based on the computed probabilities.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
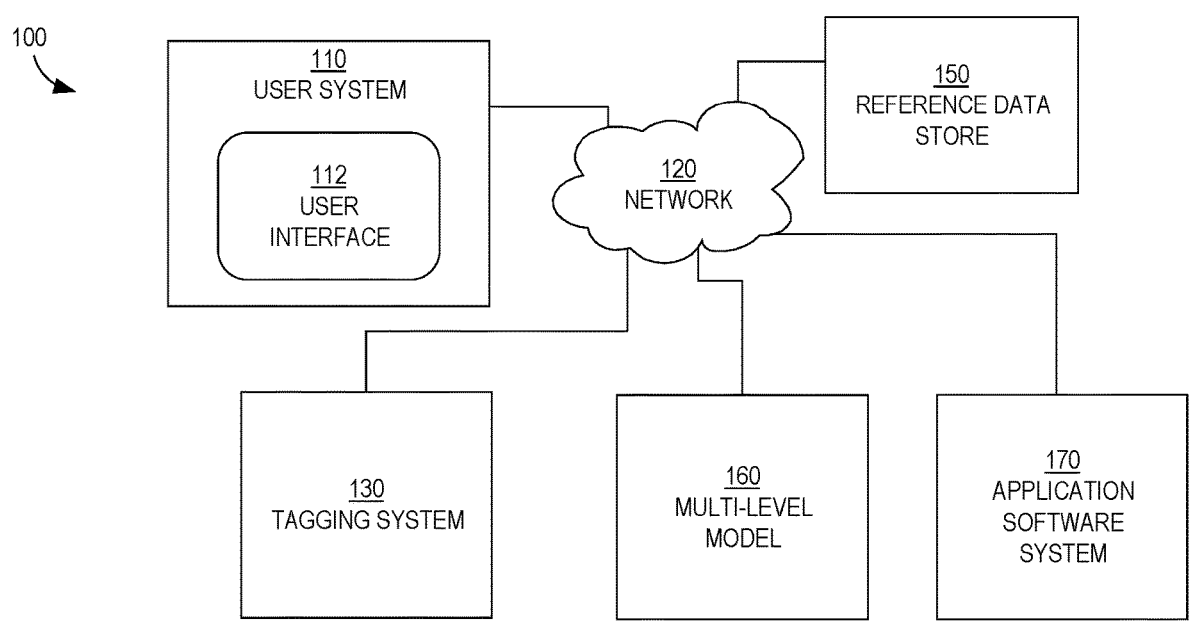
FIG. 1 is a block diagram illustrating at least one embodiment of a computing system in which aspects of the present disclosure may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Semantic tags produced by an automated tagging system using prior statistical modeling approaches can be inaccurate due to their lack of context. The lack of context is inherent in the prior approaches because the prior approaches analyze the meaning of each word independently of other words. The inability of prior approaches to determine and use context information is especially problematic when the meaning of text is ambiguous. For example, given the query, "Find me a candidate who is good at Microsoft," a prior statistical modeling approach may be unable to determine the intended meaning of the query term, Microsoft, e.g., whether it should be tagged as a company or as a skill.

When the wrong semantic tag is applied to text, or no tag is applied to the text due to the system's lack of statistical confidence in its tag prediction, an error is introduced by the mis-tagging or lack of tagging of the text. The error is propagated through the downstream processing of the text. For example, an incorrect semantic tag can result in an incorrect interpretation of the text by a downstream application or process. If the downstream application is a search engine, for instance, and a query term is incorrectly tagged as a company rather than as a skill, the results returned by the search engine will not be responsive to the original query and the search engine will not have performed well. Similarly, if the downstream application is a machine translation system, an incorrect tag or absence of a tag will likely result in an inaccurate translation of the text.

As described in more detail below, embodiments of the disclosed approaches improve upon prior approaches by configuring and using a multi-level model architecture to generate features of a text sequence. The features generated by the multi-level model are used to produce a tagged version of the text sequence and include, for example, semantic embeddings and tag prediction data.

An embodiment of the multi-level model architecture includes at least one deep neural network (DNN)-based feature generation model, a DNN-based predictive model, and at least one lexicon-based predictive model. Output of the at least one DNN-based feature generation model is coupled to the DNN-based predictive model. The DNN-based predictive model, which also may be referred to as a contextual encoder, outputs DNN-based tag prediction data based on the features generated by the at least one DNN-based feature generation model. The at least one lexicon-based predictive model, which also may be referred to as a statistical model, a language model, a lexicon, or a vocabulary, outputs lexicon-based tag prediction data based on words and/or segments of the text sequence.

Output of both the DNN-based predictive model and the at least one lexicon-based predictive model are coupled to an input of a decoder model. The decoder model, which also may be referred to as a sequential tagger or a statistical model, outputs a tagged version of the text sequence based on the tag prediction data produced by the DNN-based predictive model and the at least one lexicon-based predictive model.

The at least one DNN-based feature generation model includes a segment-level DNN-based feature generation model. The segment-level DNN-based feature generation model generates segment-level features, for example segment-level semantic embeddings, for each word of a text sequence. The multi-level model architecture uses the segment-level features to predict semantic tags for the words of the text sequence.

The incorporation of the segment-level DNN-based feature generation model into the model architecture improves tagging accuracy by incorporating into the tagging process context information that has been unavailable to traditional statistical models. To incorporate a segment-level DNN-based feature generation model into the model architecture, the disclosed approaches have overcome a technical challenge known as the double looping problem.

Segment-level feature engineering requires two layers of looping: one on a variable segment length and one on the starting position and probability computation. For instance, given an input text sequence, "Microsoft machine learning engineer," the first loop identifies words that are going to be the starting word of a segment. Based on the starting word, the second loop determines the length of the segment. This has been referred to as "double looping". Double looping is problematic because a $O(N^2)$ brute-force solution is needed to enumerate the segments. "$O(N^2)$" refers to algorithmic complexity that grows linearly and directly proportional to the size of the input data set and "$N^2$" indicates that the algorithm requires two for loops that iterate over N*N elements in the worst case scenario. Due to the algorithmic complexity, double looping makes neural networks very complex and the latency of the learning and inference processes delays the serving of downstream applications. As described in more detail below, the disclosed approaches avoid the double looping problem by enumerating all combinations of segmentations for a given text sequence using a single loop.

Some embodiments of the multi-level architecture include a character-level DNN-based feature generation model, which generates, for each word of an input text sequence, a set of character-level features. The incorporation of a character-level model enables the multi-level architecture to generate features even for words that are infrequently seen, misspelled, or out-of-vocabulary.

Some embodiments of the multi-level architecture include a word-level DNN-based model. The incorporation of a word-level DNN-based model enables the multi-level architecture to generate, for each word of an input text sequence, a set of word-level features that includes, for example, features that represent different levels of abstraction (e.g., character-level, word-level, segment level) at different layers of the neural network model. A word-level DNN-based model also enables word-level features to be fine-tuned on domain-specific training data, which can further improve the accuracy of the tagging system by tailoring the features to a particular domain application.

As noted above, embodiments of the multi-level architecture include a segment-level DNN-based feature generation model. The incorporation of a segment-level DNN-based feature generation model enables the multi-level architecture to generate, for each word in a text sequence, segment-level features. Using the segment-level features, each word in a text sequence can be assigned a semantic representation that is based on the word's context, thereby reducing ambiguity.

In some embodiments, at least two of character-level, word-level, and segment-level feature sets output by DNN-based feature generation models are combined and input into a DNN-based predictive model. The DNN-based predictive model outputs DNN-based tag prediction data for individual words of the text sequence. The DNN-based tag prediction data output by the DNN-based predictive model are, in some embodiments, combined with tag prediction data for individual words of the text sequence that have been output by the lexicon-based predictive model.

The lexicon-based predictive model uses a pre-determined lexicon to make tag predictions based on word-level features and/or segment-level features of a text sequence. The lexicon-based tag prediction data output by the lexicon-based predictive model and the DNN-based tag prediction data are combined and input into another statistical model, which may be referred to as a decoder or a sequential tagger. The decoder or sequential tagger outputs a final set of tag predictions for the input text sequence based on the combination of the lexicon-based tag prediction data and the DNN-based tag prediction data.

That is, each of the DNN-based predictive model and the lexicon-based predictive model independently outputs a different set of tag prediction data. These separate sets of tag prediction data then may be combined and input into the decoder/sequential tagger to produce a final set of tag predictions for an input text sequence.

Context as used herein may refer to, given a text sequence that contains text to be tagged, a segment of the text sequence that does not contain the text to be tagged. The segment that provides context for the text to be tagged may be adjacent to the text to be tagged or separated from the text to be tagged by other text of the text sequence. For example, given the sentence, "The bank is very nice to go walking along," a prior statistical modeling approach may incorrectly tag the word "bank" as a financial institution because the prior statistical modeling approach interprets individual words independently of other words. In contrast, the disclosed approaches can correctly tag the word "bank" as meaning a river bank because the multi-level model architecture is able to incorporate the context provided by the latter part of the sentence, "walking along," into its interpretation of the word "bank" even though there are several other words between "bank" and "walking along." For ease of discussion, as used herein, "word" may refer to a distinct element of speech or writing in any human-spoken language but may also refer to an n-gram, where n is a positive integer, in some embodiments.

In cases where an input text sequence contains only one word, different sub-portions, for example, n-grams, of the word may be used as segments to determine context. For example, a sub-portion of a word that includes a capitalized letter or a special character, such as a hyphen or slash, may be a segment and may provide valuable context information. Thus, as used herein, segment may refer to a sub-portion of the text to be tagged, itself, or a portion of a text sequence that does not include the text to be tagged.

Automated tagging systems typically provide a service that may be frequently called by many different downstream software applications. As such, latency is often an important consideration. Some embodiments of the multi-level model architecture are designed to reduce latency by performing at least some portions of the multi-level feature generation offline. This allows the online portion of the tagging system to obtain the multi-level features efficiently, e.g., by a simple look-up.

Example Use Case

One example of a downstream application that may use the output of the disclosed tagging approaches is an information retrieval system such as a search engine. In some embodiments, the disclosed tagging approaches may be implemented as a service that is callable by the information retrieval system using, for example, an application program interface or an inter-process communication mechanism. In other embodiments, the disclosed tagging approaches may be implemented as part of the information retrieval system.

Other Use Cases

Experiments have shown that the disclosed technologies are capable of, for example, improving the accuracy of named entity recognition in search queries of shorter lengths, e.g., queries that contain less than approximately 10 search terms. Certain of the disclosed embodiments are described in the context of search queries. However, it should be understood that the disclosed technologies are not limited to information retrieval applications but may be used to perform semantic tagging for other applications, including any other application that relies on semantic interpretations of text. Examples of such applications include but are not limited to speech recognition, natural language dialog (e.g., chatbots), machine translation, sentiment analysis, and various text classification applications.

In other use cases, the multi-level model architecture of the disclosed technologies facilitates the use of transfer learning to personalize semantic tagging by incorporating user feedback (e.g., click data) received in response to system output that has been produced using predicted tags.

In still other use cases, the disclosed multi-level model architecture facilitates the adaptation of the tagging system to a wide variety of text tagging tasks, including the tagging of longer text sequences. Whereas the length of a typical search query may be in the range of about one to about ten words, longer text may refer to text sequences that exceed ten words. Examples of longer text include user profiles, job postings, social media posts, comments, messages, tweets, articles, article summaries, audio transcriptions, and web pages. The disclosed multi-level model architecture can be adapted to longer-text applications by updating only the relevant DNN-based models through training with the longer-text training data, while other portions of the architecture need not be modified.

Example Computing System

FIG. 1 illustrates a computing system in which embodiments of the features described in this document can be implemented. In the embodiment of FIG. 1, computing system 100 includes a user system 110, a tagging system 130, a reference data store 150, a multi-level model 160, and an application software system 170.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 may be or include a front-end portion of application software system 170.

User interface 112 is any type of user interface as described above. User interface 112 may be used to input search queries and view or otherwise perceive output produced by tagging system 130, multi-level model 160, and/or application software system 170. For example, user interface 112 may include a graphical user interface or a conversational voice/speech interface that includes a mechanism for entering and viewing a search query, a message, a social media post, or other digital content.

Tagging system 130 is configured to perform semantic tagging of text sequences using the multi-level modeling approaches described herein. Example implementations of the functions and components of tagging system 130 are shown in the drawings and described in more detail below.

Multi-level model 160 includes one or more machine learning models. Portions of multi-level model 160 may be part of or accessed by or through another system, such as tagging system 130 or application software system 170. Multi-level model 160 may reside on a single device or be distributed across multiple devices. Example implementations of the functions and components of multi-level model 160 are shown in the drawings and described in more detail below.

Application software system 170 is any type of application software system. Examples of application software system 170 include but are not limited to connections network software, such as social media platforms, and systems that may or may not be based on connections network software, such as general-purpose search engines, job search software, recruiter search software, sales assistance software, advertising software, learning and education software, or any combination of any of the foregoing. Other examples of application software include any of the examples of downstream applications mentioned above.

While not specifically shown, it should be understood that any of tagging system 130, multi-level model 160 and application software system 170 includes an interface embodied as computer programming code stored in computer memory that when executed causes a computing device to enable bidirectional communication between application software system 170 and tagging system 130. For example, a front end of application software system 170 may include an interactive element that when selected causes the interface to make a data communication connection between application software system 170 and tagging system 130. For example, a detection of user input by a front end of application software system 170 may initiate data communication with tagging system 130 using, for example, an application program interface (API).

Reference data store 150 includes at least one digital data store that stores, for example, lexicon data used by a lexicon-based predictive model, model training data, hyperparameter values, and model parameter values. Examples of lexicon data include associations of words with semantic categories. Categories may have been determined in accordance with a particular domain application. Associations of words with categories may have been derived from data that is publicly available or used with permission. For example, lexicon data may be derived from user profile data, job posting data, and/or user activity data.

Stored data of reference data store 150 may reside on at least one persistent and/or volatile storage device that may reside within the same local network as at least one other device of computing system 100 and/or in a network that is remote relative to at least one other device of computing system 100. Thus, although depicted as being included in computing system 100, portions of reference data store 150 may be part of computing system 100 or accessed by computing system 100 over a network, such as network 120.

A client portion of application software system 170 may operate in user system 110, for example as a plugin or widget in a graphical user interface of a software application or as a web browser executing user interface 112. In an embodiment, a web browser may transmit an HTTP request over a network (e.g., the Internet) in response to user input that is received through a user interface provided by the web application and displayed through the web browser. A server running tagging system 130 and/or multi-level model 160 and/or a server portion of application software system 170 may receive the input, perform at least one operation using the input, and return output using an HTTP response that the web browser receives and processes.

Each of user system 110, tagging system 130, multi-level model 160 and application software system 170 is implemented using at least one computing device that is communicatively coupled to electronic communications network 120. Tagging system 130 may be bidirectionally communicatively coupled to user system 110, multi-level model 160 and/or application software system 170, by network 120. User system 100 as well as one or more different user systems (not shown) may be bidirectionally communicatively coupled to application software system 170.

A typical user of user system 110 may be an end user of application software system 170 or an administrator of tagging system 130, multi-level model 160, or application software system 170. User system 110 is configured to communicate bidirectionally with at least application software system 170, for example over network 120. Examples of communicative coupling mechanisms include network interfaces, inter-process communication (IPC) interfaces and application program interfaces (APIs).

The features and functionality of user system 110, tagging system 130, reference data store 150, multi-level model 160, and application software system 170 are implemented using computer software, hardware, or software and hardware, and may include combinations of automated functionality, data structures, and digital data, which are represented schematically in the figures. User system 110, tagging system 130, reference data store 150, multi-level model 160, and application software system 170 are shown as separate elements in FIG. 1 for ease of discussion but the illustration is not meant to imply that separation of these elements is required. The illustrated systems and data stores (or their functionality) may be divided over any number of physical systems, including a single physical computer system, and can communicate with each other in any appropriate manner.

Network 120 may be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

It should be understood that computing system 100 is just one example of an implementation of the technologies disclosed herein. While the description may refer to FIG. 1 or to "system 100" for ease of discussion, other suitable configurations of hardware and software components may be used to implement the disclosed technologies. Likewise, the particular embodiments shown in the subsequent drawings and described below are provided only as examples, and this disclosure is not limited to these exemplary embodiments.

Example Tagging System

Figure 2:
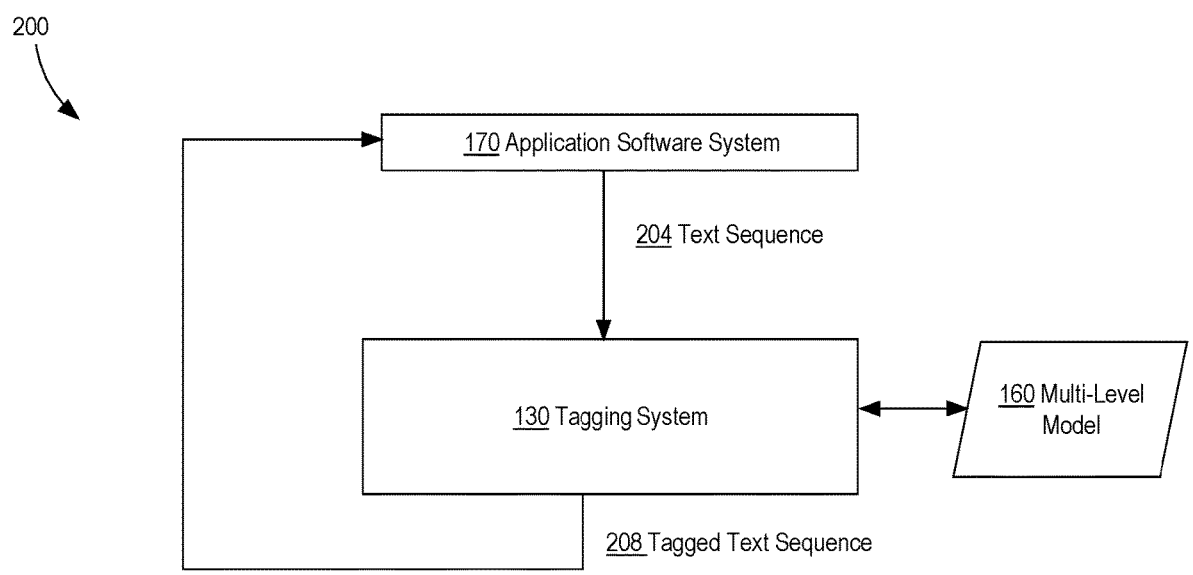
FIG. 2 is a flow diagram of a process that may be used to implement a portion of the computing system of FIG. 1.

FIG. 2 is a simplified flow diagram of an embodiment of operations and components of a computing system capable of performing aspects of the disclosed technologies. The operations of a flow 200 as shown in FIG. 2 can be implemented using processor-executable instructions that are stored in computer memory. For purposes of providing a clear example, the operations of FIG. 2 are described as performed by computing system 100, but other embodiments may use other systems, devices, or implemented techniques.

In FIG. 2, tagging system 130 receives a text sequence from application software system 170 via a bi-directional communicative coupling such as an application program interface, inter-process communication, or network interface. Text sequence 204 includes unstructured natural language text, which includes at least one word. Examples of text sequences are provided above and include, for example, search queries which may have been input by a user interacting with user interface 112. Text sequence 204 contain text in any human-spoken language or multiple different human-spoken languages. Text sequence 204 may contain text that has been input into computing system 100 by a keyboard, keypad or similar device. Alternatively or in addition, text sequence 204 may contain text that has been transcribed or derived from audio signals or other forms of digital or analog sensor signals.

Tagging system 130 applies one or more semantic tags to text sequence 204 through bi-directional communication with multi-level model 160 to produce tagged text sequence 208. For each word of text sequence 204, multi-level model 160 inputs model input data extracted from text sequence 204 into at least two different machine learning-based feature generation models. The at least two different machine learning-based feature generation models include a segment-level DNN-based model and at least one other type of machine learning-based model.

The at least one other type of machine learning-based model may include any one or more of a word-level DNN-based model, a character-level DNN-based model, and a lexicon-based model. The selection of DNN-based models may be determined by the requirements of a particular use case or implementation. The DNN-based feature generation models each output a semantic embedding in response to their respective input. For example, a segment-level DNN-based model outputs a segment-level embedding in response to segment-level model input. Similarly, a character-level DNN-based model outputs a character-level embedding in response to character-level model input and a word-level DNN-based model outputs a word-level embedding in response to word-level model input. As used herein, embedding may refer to a semantic representation of a portion of an input text sequence. For example, an embedding may be an n-dimensional feature vector, where n may be a positive integer in the range up to including about 8-10 dimensions for the lexicon-based model and up to 1000 or more dimensions for the DNN-based models.

The lexicon-based statistical model outputs lexicon-based tag prediction data. The output of the at least two different feature generation models is combined and input into a decoder model. The output of the DNN-based feature generation models may be input into a DNN-based encoder model to produce DNN-based tag prediction data which is then combined with the lexicon-based tag prediction data output by the lexicon-based statistical model, such that the combination of the DNN-based tag prediction data and the lexicon-based tag prediction data is input into the decoder model. The decoder model outputs tagged text sequence 208.

Example implementations of tagging system 130, multi-level model 160 and communications between tagging system 130 and multi-level model 160 are described in detail below. Tagging system 130 outputs tagged text sequence 208 for use by application software system 170. For the use case in which application software system 170 is a search engine, text sequence 204 may correspond to a search query received by the search engine, and tagged text sequence 208 may correspond to a tagged version of the search query.

Tagging as used herein may refer to a process of annotating text sequence 204 with one or more semantic tags. Tagging may be performed using, for example, a markup language such as eXtensible Markup Language (XML). Examples of semantic tags include but are not limited to type, category, or topic labels such as date, location, company name, skill, job title, person name.

After receiving tagged text sequence 208 from tagging system 130, application software system 170 may use tagged text sequence 208 to perform one or more downstream operations. For example, application software system 170 may use both the original text sequence 204 and the tags added by tagging system 130 to formulate a search query, execute the search query on a corpus of stored digital content, and display results retrieved by the search query on user interface 112.

Example Tagging Process

Figure 3:
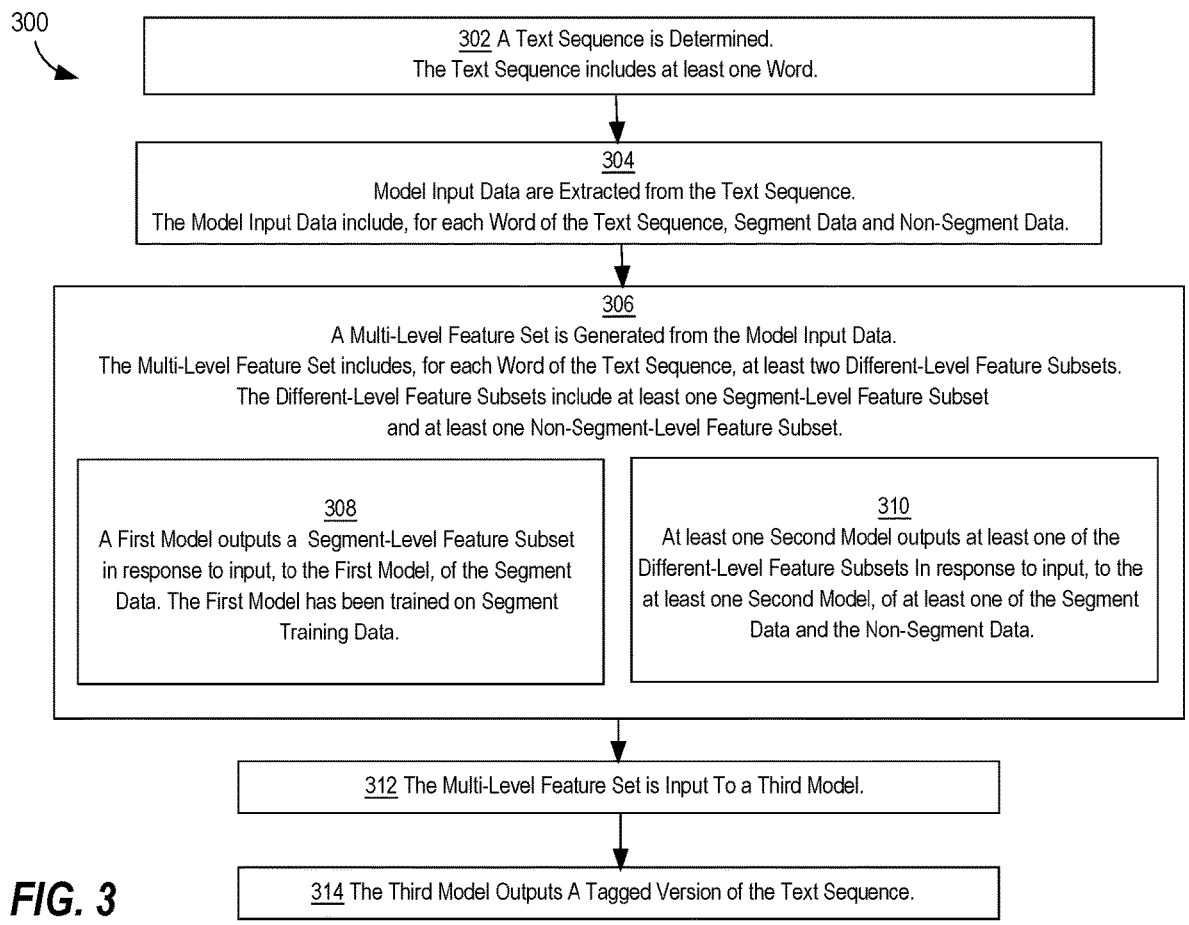
FIG. 3 is a flow diagram of a process that may be used to implement a portion of the computing system of FIG. 1.

FIG. 3 is a simplified flow diagram of an embodiment of operations that can be performed by at least one device of a computing system. The operations of a flow 300 as shown in FIG. 3 can be implemented using processor-executable instructions that are stored in computer memory. For purposes of providing a clear example, the operations of FIG. 3 are described as performed by computing system 100, but other embodiments may use other systems, devices, or implemented techniques.

Operation 302 when executed by at least one processor causes one or more computing devices to determine a text sequence. The text sequence includes unstructured natural language text, which includes at least one word. The text sequence may be obtained from a software application, such as a downstream software application of application software system 170, described above.

Operation 304 when executed by at least one processor causes one or more computing devices to extract model input data from the text sequence determined in operation 302. The model input data include, for each word of the text sequence, segment data and non-segment data. Examples of non-segment data include words extracted from the text sequence and characters extracted from the text sequence. In one implementation, segment data is generated by determining a text sequence length threshold and a segment length threshold, and, if the text sequence satisfies the text sequence length threshold, generating segments of the text sequence that each have a length that is less than or equal to the segment length threshold. An example of a segmentation approach is shown in FIG. 4C and FIG. 4D, described below.

Operation 306 when executed by at least one processor causes one or more computing devices to generate, for each word of the text sequence, a multi-level feature set from the model input data extracted from the text sequence in operation 304. The multi-level feature set includes, for each word of the text sequence, at least two different-level feature subsets. The different-level feature subsets include at least one segment-level feature subset and at least one non-segment-level feature subset.

The at least one segment-level feature subset is generated using the segment data of operation 304. The at least one non-segment-level feature subset is generated using the non-segment data of operation 304. An example of different-level feature subsets is a set of segment-level embeddings and a set of word-level embeddings. Another example of different-level feature subsets is a set of segment-level lexicon-based tag prediction data and a set of word-level lexicon-based tag prediction data. Some embodiments use segment-level embeddings, word-level embeddings, character-level embeddings, segment-level lexicon-based prediction data and word-level lexicon-based tag prediction data. Other embodiments use segment-level embeddings and one or more of the following: word-level embeddings, character-level embeddings, segment-level lexicon-based prediction data and word-level lexicon-based tag prediction data. The selection of feature types may be determined by the requirements of a particular use case or implementation.

The multi-level feature set may include tag prediction data. The tag prediction data may include lexicon-based tag prediction data output by a lexicon-based statistical model in response to input, to the lexicon-based statistical model of at least one of (i) the segment data, (ii) word data of the non-segment data, or (iii) both (i) and (ii). Alternatively or in addition, the tag prediction data may include DNN-based tag prediction data output by a DNN-based predictive model in response to input, to the DNN-based predictive model, of output of at least one of (i) a segment-level DNN-based feature generation model, (ii) a word-level DNN-based feature generation model, (iii) a character-level DNN-based feature generation model, or (iv) any combination of (i), (ii), (iii), (iv). An example implementation of a DNN-based predictive model is contextual encoder 412 of FIG. 4A, described in more detail below.

Operation 308 when executed by at least one processor causes one or more computing devices to operate a first model. In one embodiment, the first model is a DNN-based machine learning model. In another embodiment, the first model is a lexicon-based predictive model. A segment-level feature subset of the at least two different-level feature subsets is output by the first model in response to input, to the first model of the segment data of operation 304 but not the non-segment data of operation 304.

As noted above, the first model may be a segment-level DNN-based feature generation model or a lexicon-based predictive model. In the case where the first model is a segment-level DNN-based feature generation model, the first model has been trained on segment training data. In the case where the first model is a lexicon-based predictive model, the first model has been trained using word training data or segment training data. Examples of word training data and segment training data are described below.

Segment training data may have been generated by determining a text sequence length threshold and a segment length threshold, where the threshold may be determined based on the performance requirements of a particular use case or implementation. For segment training data that satisfies the text sequence length threshold, a plurality of segments of the segment training data are generated that each satisfy the segment length threshold. In different embodiments, to "satisfy" a threshold means that a segment length is longer than, longer than or equal to, shorter than, or shorter than or equal to, the threshold value. In other embodiments, Word training data may include words that have been labeled with ground-truth semantic categories.

Operation 310 when executed by at least one processor causes one or more computing devices to operate at least one second model. The training data used to train the at least one second model is determined based on the type of model selected as the at least one second model, where the type of model corresponds to the level of abstraction (e.g., character-level, word-level, segment-level). For example, if the at least one second model includes a second segment-level model then the segment-level model is trained using segment-level training data. If the at least one second model includes a word-level model, the word-level model is trained using word-level training data. If the at least one second model includes a character-level model, the character-level model is trained using character-level training data.

The at least one second model outputs at least one of the different-level feature subsets in response to input, to the at least one second model, of at least one of the segment data and the non-segment data. For example, a lexicon-based predictive model that outputs lexicon-based tag prediction data in response to input, to the lexicon-based predictive model, of segment data or word data extracted from the text sequence in operation 304, may be an at least one second model. For instance, in one implementation, the first model may be a segment-level DNN-based feature generation model and one of the at least one second models may be a segment-level lexicon-based predictive model. In other implementations, the first model may be a segment-level lexicon-based predictive model and one of the at least one second models may be a word-level lexicon-based predictive model, a word-level DNN-based feature generation model, a character-level DNN-based feature generation model, or any combination of the foregoing.

As another example, a character-level DNN-based feature generation model that outputs character level embeddings in response to input, to the character-level DNN-based feature generation model, of character-level data extracted from the text sequence in operation 304, may be an at least one second model. As an additional example, a word-level DNN-based feature generation model that outputs word-level embeddings in response to input, to the word-level DNN-based feature generation model of word-level data extracted from the text sequence in operation 304, may be an at least one second model.

Operation 312 when executed by at least one processor causes one or more computing devices to input the multi-level feature set to a third model. The third model may be a DNN-based predictive model, e.g., a contextual encoder, which generates tag prediction data for the text sequence based on multi-level embeddings output by one or more DNN-based feature generation models. In this case, the third model output is coupled to a fourth model, e.g., a decoder or sequential tagger, which produces a tagged version of the text sequence.

The third model may alternatively be a decoder or a sequential tagger that generates a tagged version of the text sequence determined in operation 302 based on different-level tag prediction data, such as segment-level tag prediction data and word-level tag prediction data produced by a lexicon-based predictive model and/or tag prediction data that has been produced by a DNN-based predictive model based on input to the DNN-based predictive model of at least two different-level feature subsets. For instance, referring to FIG. 4A, decoder 412 or sequential tagger 420 may be considered as the third model. For example, where a DNN-based feature generation model outputs feature data, a decoder outputs tag prediction data in response to the feature data produced by the DNN-based feature generation model. Alternatively, where a sequential tagger is considered to be the third model, the third model takes as input the tag prediction data output by the decoder alone or in combination with tag prediction data output by one or more lexicon-based predictive models.

In the case where the third model is a sequential tagger, the third model outputs the tagged version of the text sequence. In doing so, the third model may group text of the text sequence according to matching tags. For instance, if, in the text sequence, "machine learning engineer," both the word "machine" and the word "learning" each have been tagged as a skill, the two words may be combined as "machine learning" and collectively tagged with one tag, skill.

Operation 314 when executed by at least one processor causes one or more computing devices to output a tagged version of the text sequence. The tagged text sequence may be output by the third model of operation 312. In doing so, operation 314 may provide the tagged version of the text sequence to the software application from which the text sequence was obtained in operation 302. The software application may use the tagged version of the text sequence to perform a downstream operation such as executing a search based at least in part on the tagged version of the text sequence.

Example Multi-Level Model Architecture

Figure 4A:
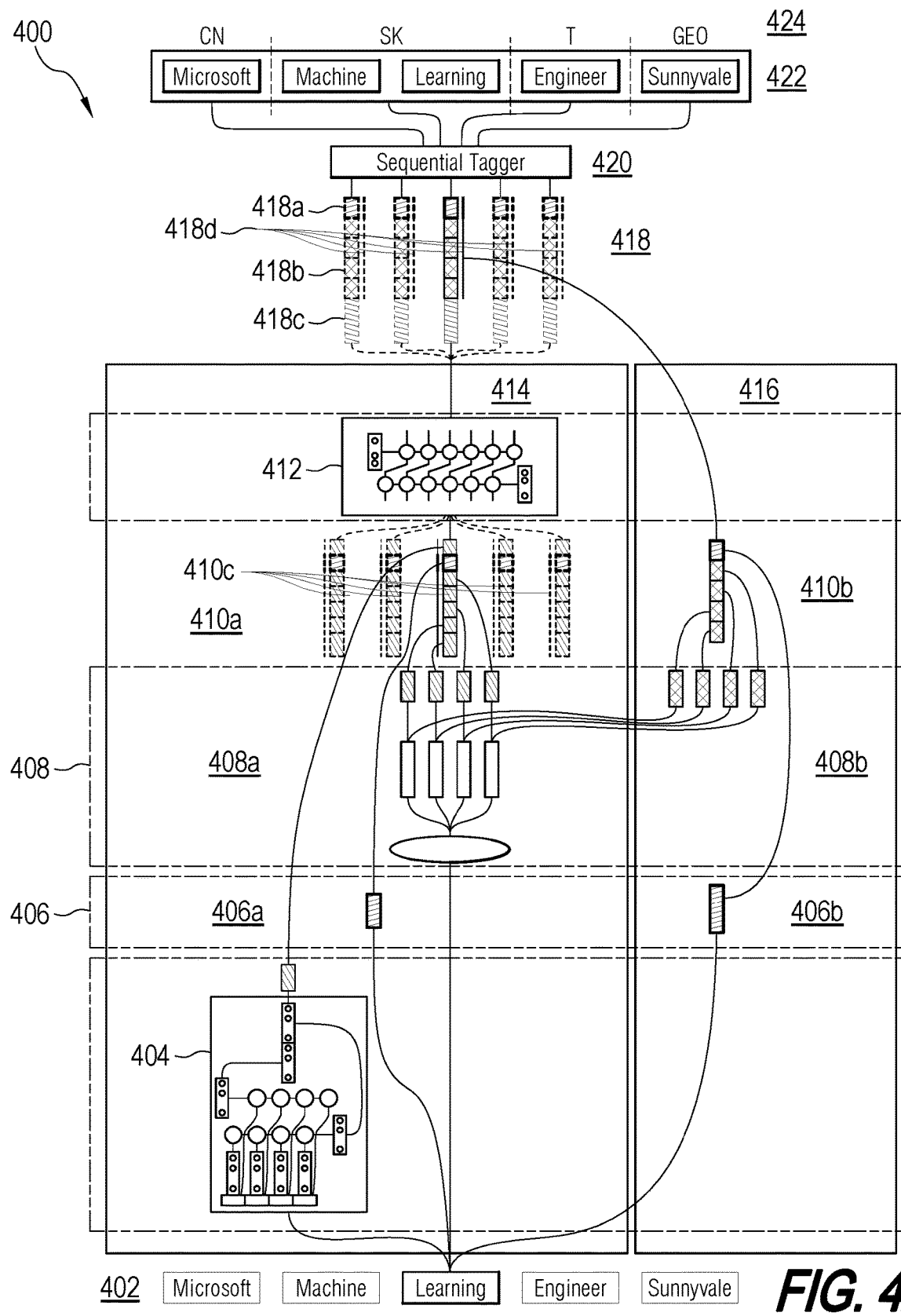
FIG. 4A is a schematic diagram of a multi-level machine learning model architecture that may be used to implement a portion of the computing system of FIG. 1.

FIG. 4A is a schematic diagram of a multi-level machine learning model architecture that may be used to implement a portion of the computing system of FIG. 1. At least one computer memory may be configured according to a multi-level model that has a model architecture such as the architecture shown in FIG. 4A. For example, computer memory may be configured to include multiple different machine learning models as described in detail below.

FIG. 4A shows a multi-level machine learning model configuration in relation to an example of an input text sequence 402. In the example of FIG. 4A, text sequence 402 contains five words, although text sequence 402 could be of any length. FIG. 4A illustrates operations of a model 400 in relation to a particular one of the words of text sequence 402, "Learning." Although not specifically shown, it should be understood that the operations illustrated in FIG. 4A in relation to the word Learning are performed for each word of text sequence 402 in order to generate a tagged version of text sequence 402.

Model 400 includes a DNN-based portion 414 and a non-DNN-based portion 416. Taken together, DNN-based portion 414 and non-DNN-based portion 416 generate a set of multi-level features for each word of text sequence 402. Each set of multi-level features may include deep character-level features, deep and wide word-level features, and deep and wide segment-level features. In one implementation, for each word of text sequence 402, model 400 produces one dense vector representing the character-level features of the word, one dense vector representing the word-level features of the word, and one dense vector representing the segment-level features of the word, using either deep learning or lexicon data or both deep learning and lexicon data.

DNN-based portion 414 of model 400 includes DNN-based feature generation components 404, 406a, 408a, 410a. DNN-based feature generation components 404, 406a, 408a, 410a generate deep features as described in more detail below. A feature may be referred to herein as deep if it is produced by a DNN-based model.

Non-DNN-based portion 416 of model 400 includes lexicon-based tag prediction components 406b, 408b, 410b. Lexicon-based tag prediction components 406b, 408b, 410b generate wide features as described in more detail below. A feature may be referred to herein as wide if it is not produced by a DNN-based model.

Whereas deep features may be represented using a very large vector, e.g., a vector having 1,000 or more dimensions, wide features are typically represented using a much smaller vector, e.g., a vector having in the range of 8-10 dimensions. Also, a deep feature, e.g., a dimension of a deep feature vector, produced by a DNN-based feature generation model may represent a particular characteristic of the text or its context that influences the location of the text in a multi-dimensional semantic space.

A wide feature, e.g., a particular dimension of a wide feature vector, may represent a probabilistic value, such as a probability that the text corresponds to a particular semantic category, where the semantic categories may be handcrafted based on the particular domain application. Because wide features can be used directly to predict semantic tags, they may be referred to as tag prediction data. On the other hand, deep features produced by a feature generation model may be input into a DNN-based predictive model to generate DNN-based tag prediction data. As such, model 400 further includes a DNN-based tag prediction component 412, a feature combination component 418, and a sequential tagger 420.

Figure 4B:
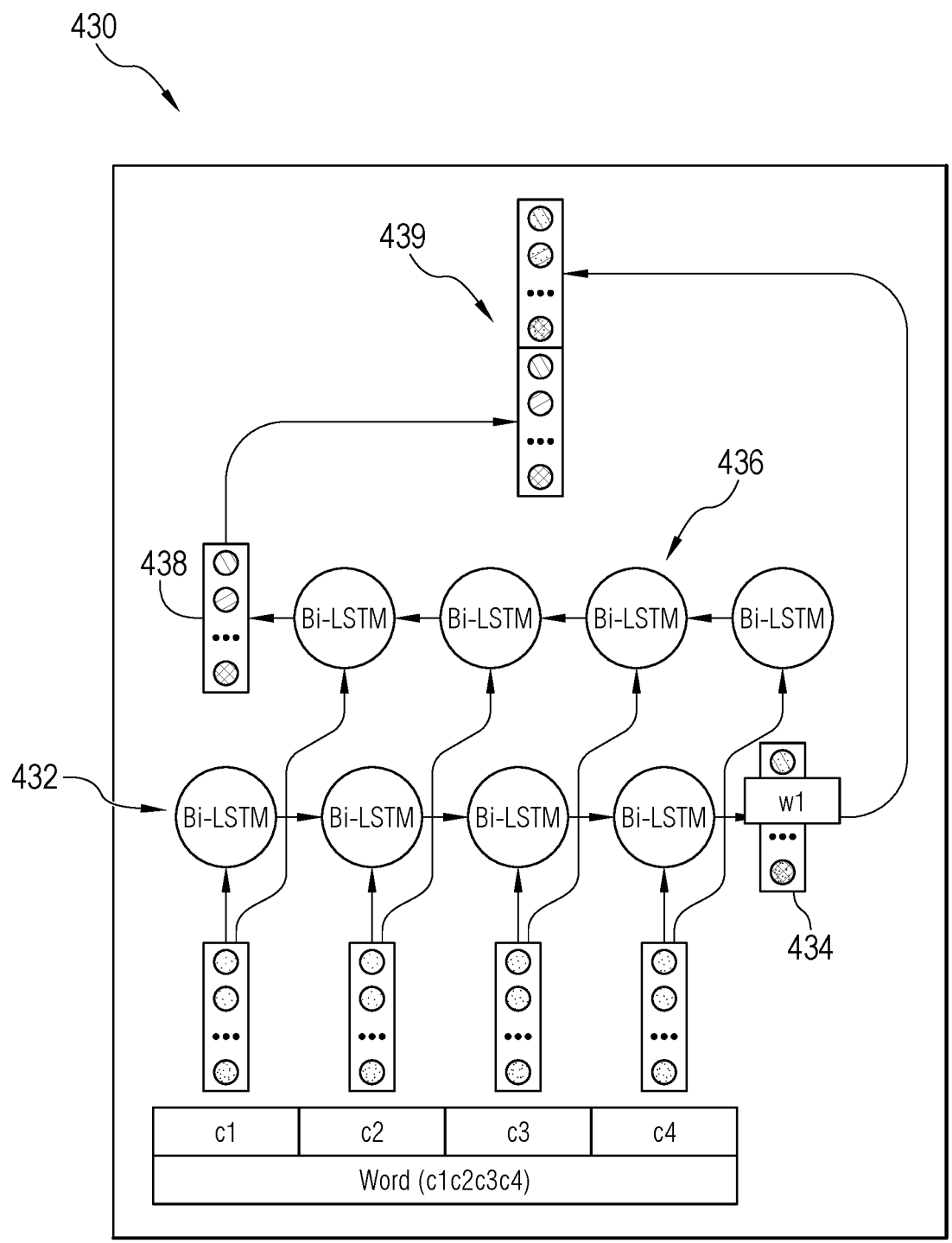
FIG. 4B is a schematic diagram of a portion of a multi-level machine learning model architecture that may be used to implement a portion of the computing system of FIG. 1.
Figure 4C:
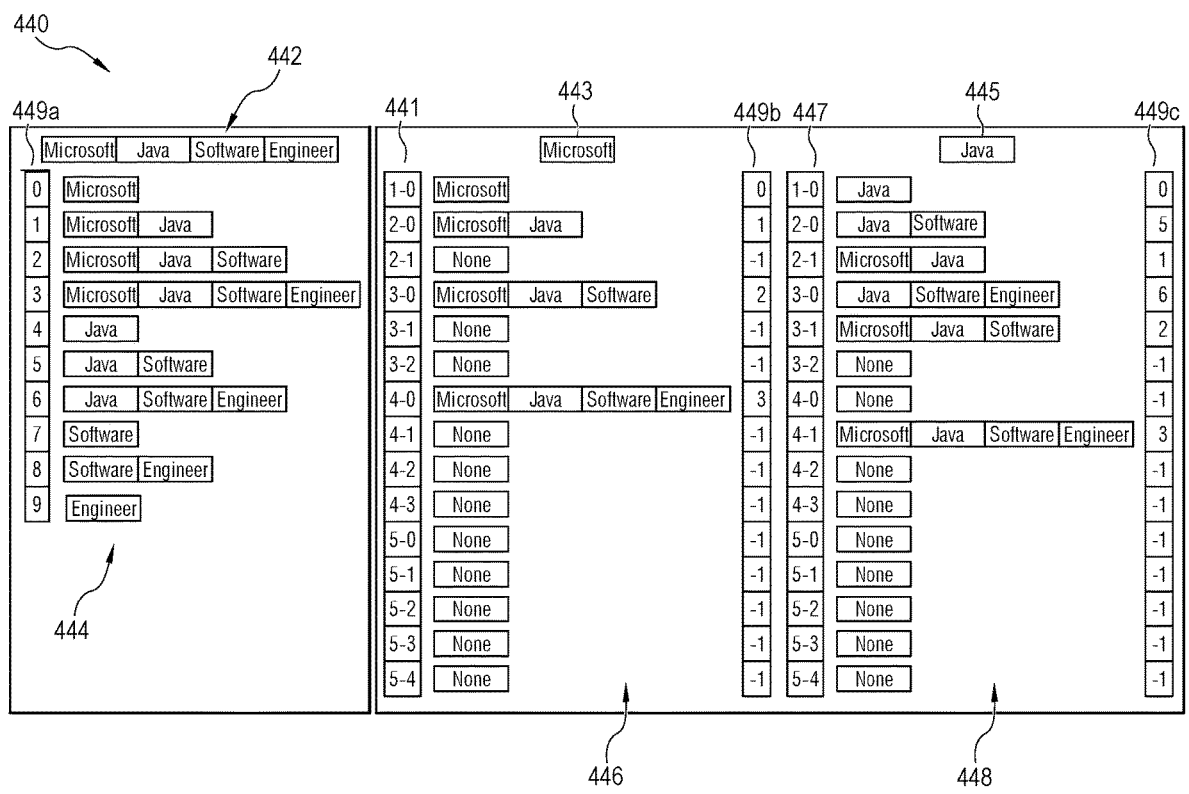
FIG. 4C is an illustration of output of a segmentation process that may be used to implement a portion of the computing system of FIG. 1.
Figure 4D:
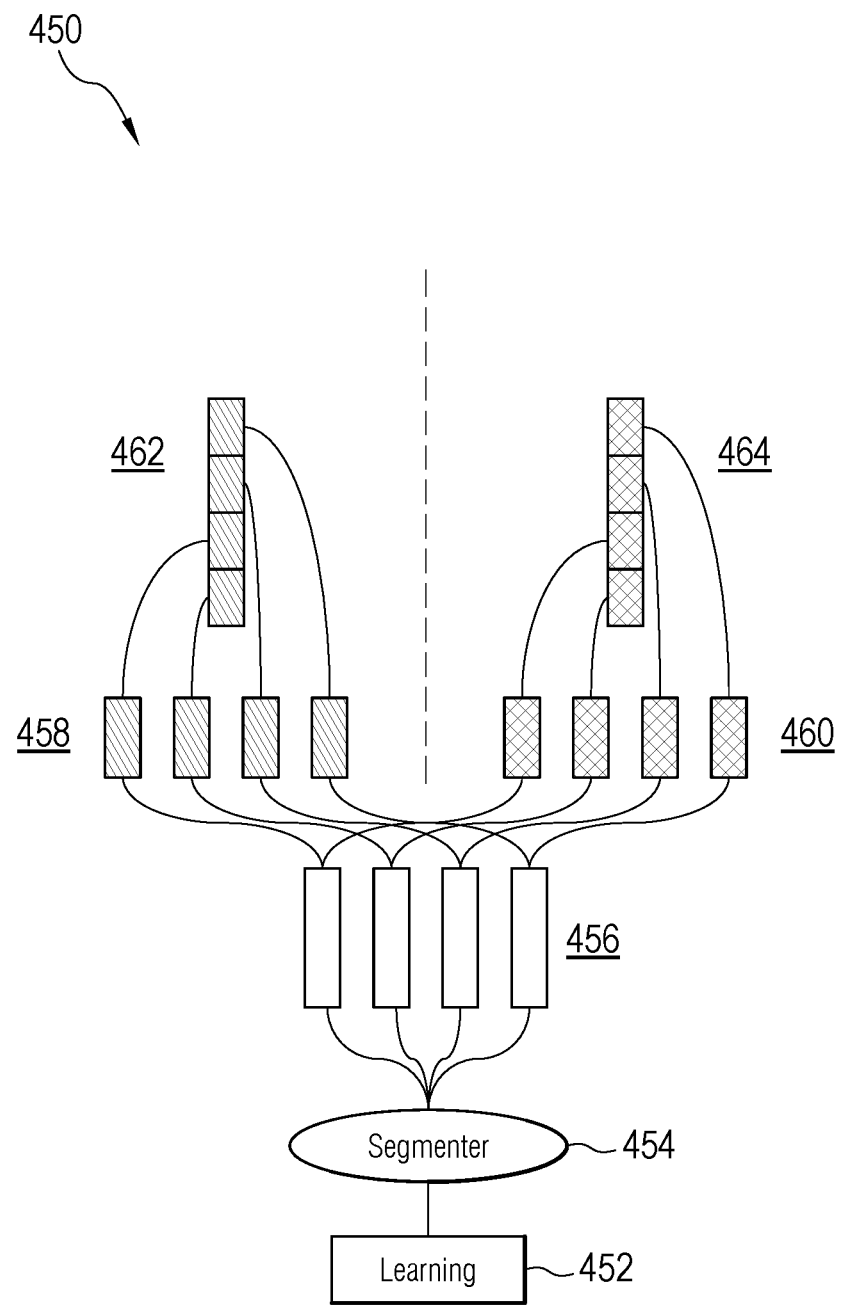
FIG. 4D is a schematic diagram of a portion of a multi-level machine learning model architecture that may be used to implement a portion of the computing system of FIG. 1.

In the embodiment of FIG. 4A, feature generation component 404 is a character-level DNN-based feature generation model. When a word of text sequence 402, such as Learning, is input to character-level model 404, character-level model 404 generates character-level features. An example implementation of character-level model 404 is shown in FIG. 4B, described below. The character-level features output by character-level model 404 are output to feature generation component 410*a*, described below.

In the embodiment of FIG. 4A, feature generation component 406 is a word-level feature generation component which includes a word-level DNN-based feature generation model 406*a* and a word-level lexicon-based model 406*b*. In response to a word of text sequence 402, such as Learning, being input to the word-level DNN-based feature generation model 406*a*, the word-level DNN-based feature generation model 406*a* outputs a set of word-level deep features for the input word. The word-level deep features output by the word-level DNN-based feature generation model 406*a* are output to feature generation component 410*a*, described below.

In response to a word of text sequence 402, such as Learning, being input to the word-level lexicon-based model 406*b*, the word-level lexicon-based model 406*b* outputs word-level wide features, e.g., word-level tag prediction data, for the input word. The word-level wide features output by the word-level lexicon-based model 406*b* are output to feature generation component 410*a*, described below.

In the embodiment of FIG. 4A, feature generation component 408 is a segment-level feature generation component which includes a segment-level DNN-based feature generation model 408*a* and a segment-level lexicon-based model 408*b*. In response to a word of text sequence 402, such as Learning, being input to the feature generation component 408, a segmentation mechanism of feature generation component 408 generates segments for the word using a segmentation approach. In the example of FIG. 4A, the segmentation mechanism generates four segments for the word, Learning, and both deep and wide feature sets are generated for each of these four segments. In other examples, a maximum number of segments determined based on segmentation constraints, which may be determined based on the requirements of a particular use case or implementation, and a corresponding number of deep and wide feature sets may be generated. An example segmentation mechanism is described below with reference to FIG. 4C and FIG. 4D.

In response to segments generated by the segmentation mechanism being input into segment-level DNN-based feature generation model 408*a*, the segment-level DNN-based feature generation model 408*a* outputs a set of segment-level deep features for the input word. The segment-level deep features output by the segment-level DNN-based feature generation model 408*a* are output to feature generation component 410*a*, described below.

In response to the segments generated by the segmentation mechanism of feature generation component 408*a* being input into segment-level lexicon-based model 408*b*, the segment-level lexicon-based model 408*b* outputs a set of segment-level wide features, e.g., segment-level tag prediction data, for the input word. The segment-level wide features output by the segment-level lexicon-based model 408*b* are output to feature generation component 410*a*, described below.

An example of a segment-level lexicon contains, for each word or n-gram of the input text sequence, statistics regarding all of the possible semantic tags (e.g., company name, person name, location, skill, title), where the statistics are based on the number of occurrences of the word or n-gram in association with each possible semantic tag in the training data. For instance, if a word or n-gram appears in training data more frequently in association with the skill category than the company category, the lexicon outputs probabilistic data indicating that an occurrence of the word or n-gram is more likely to be a skill than a company.

It should be noted that word-level lexicon-based model 406*b* and segment-level lexicon-based model 408*b* may be the same model trained on the same training data or the same model trained on different training data. For example, word-level lexicon-based model 406*b* may be a statistical model trained on word-level training data and segment-level lexicon-based model 408*b* may be a similar statistical model that has been trained on segment-level training data.

Feature generation component 410 includes a first deep feature combination mechanism 410*a* and a wide feature combination mechanism 410*b*. Deep feature combination mechanism 410*a* combines the character-level deep features output by character-level model 404, the word-level deep features output by word-level model 406*a*, and the segment-level deep features output by segment-level model 408*a*, into a single, multi-level feature set for each word of the text sequence. To do this, deep feature combination mechanism 410*a* uses, for example, a concatenation function.

A second deep feature combination mechanism 410*c* combines the word-based multi-level feature sets into a single multi-level, multi-word feature set for the entire text sequence 402. To do this, deep feature combination mechanism 410*c* uses, for example, a concatenation function. Thus, in the example of FIG. 4A, there are five words in text sequence 402, five word-based multi-level feature sets produced by feature combination mechanism 410*a*, and one multi-level feature set produced by feature combination mechanism 410*c*. Other examples include any number of words and corresponding numbers of feature sets. The number of words in an input text sequence may be constrained, for example by an upper bound, which may be determined in accordance with the requirements of a particular use case or implementation. Likewise, the number of word-level feature sets that are generated is also constrained by the maximum size of the input text sequence.

Wide feature combination mechanism 410*b* combines the word-level wide features output by word-level model 406*b* and the segment-level wide features output by segment-level model 408*b* into a single, multi-level feature set for each word of text sequence 402. To do this, feature combination mechanism 410*b* uses, for example, a concatenation function.

DNN-based tag prediction component 412 generates DNN-based tag prediction data 418*c* for the multi-level feature set produced by concatenation mechanism 410*c*. An example implementation of DNN-based tag prediction component 412 is described in more detail below.

Feature combination mechanism 418 combines, for each word of text sequence 402, DNN-based tag prediction data 418*c*, segment-level lexicon-based tag prediction data 418*b*, which has been output by segment-level lexicon-based predictive model 408b, and word-level lexicon-based tag prediction data 418a, which has been output by word-level lexicon-based predictive model 406b. To do this, feature combination mechanism 418 uses, for example, a concatenation function.

Feature combination mechanism 418 outputs deep and wide features 418d for each word of text sequence 402. Thus, in the example of FIG. 4A, in which text sequence 402 contains five words, there are five inputs to sequential tagger 420, where each input includes both deep and wide features for a particular word of text sequence 402. In other examples, text sequence 402 contains any number of words and a corresponding number of deep and wide features.

In response to input of deep and wide features 418d to decoder or sequential tagger 420, decoder or sequential tagger 420 outputs a tagged version of text sequence 402, which is represented in FIG. 4A by grouped text sequence 422 and tags 424. In doing so, decoder or sequential tagger 420 performs a grouping process, which also may be referred to as segmenting, however that term is not used here to avoid confusion with the segmentation mechanism of feature generation component 408.

The grouping process of decoder or sequential tagger 420 groups words of text sequence 402 according to matching tags. Thus, in the example of FIG. 4A, the word Machine and the word Learning have been grouped together because they both have been tagged with the tag, skill. Also in the example of FIG. 4A, the word Microsoft has been tagged as a company name, the word Engineer has been tagged as a job title, and the word Sunnyvale has been tagged as a geographic location.

Example Character-Level Model

FIG. 4B is a schematic diagram of a portion of a multi-level machine learning model architecture that may be used to implement a portion of the computing system of FIG. 1. More specifically, FIG. 4B illustrates one implementation of character-level model 404. In FIG. 4B, a character-level DNN-based model 430 is shown. FIG. 4B illustrates an example in which an input word is made up of four characters, $c1$, $c2$, $c3$, $c4$, but an input word may have any number of characters.

Model 430 is a deep binary long term short term memory (Bi-LSTM) model. In response to a word of text sequence 402 being input into model 430, model 430 outputs a character-level embedding for each character of the word. The character-level embeddings corresponding to each character of the input word are input in direct and reverse order, respectively, to a forward LSTM 432 and a backward LSTM 436. Forward LSTM produces a forward representation 434 of the input word. Backward LSTM produces a reverse order representation of the input word. A character-level embedding 439, derived from the characters of the word, is the concatenation of the forward and reverse order representations.

Example Word-Level Models

As shown by FIG. 4A, multi-level model 400 includes word-level models 406. Word-level models 406 include a word-level DNN-based model 406a and a word-level lexicon-based model 406b. Word-level DNN-based model 406a may be implemented using a pre-trained model, for example, BERT (Bidirectional Encoder Representations from Transformers) or a version of BERT that has been fine-tuned for a particular domain application. Other implementations may use other machine learning techniques for natural language processing.

Word-level lexicon-based model 406b may be implemented using a statistical model such as a conditional random field (CRF) model or a semi-Markov conditional random field (SCRF) or a hidden Markov model (HMM). Word-level lexicon-based model 406b may contain multiple lexicons, each of which may be based on different training data. An example of a word-level lexicon contains, for each word, statistics regarding all of the possible semantic tags (e.g., company name, person name, location, skill, title), where the statistics are based on the number of occurrences of the word in association with each possible semantic tag in the training data. For instance, if a word appears in training data more frequently in association with the skill category than the company category, the lexicon outputs probabilistic data indicating that an occurrence of the word is more likely to be a skill than a company.

In one implementation, the segment permutations generated by the segmentation mechanism for a word contain the word itself. As a result, when segment-level deep features are generated, word-level deep features also are generated. Thus, for example, word-level DNN-based model 406a may be considered to be incorporated into segment-level DNN-based model 408a. For example, segment-level DNN-based model 408a may processes individual words as well as segments generated by the segmentation mechanism, such that word-level deep features and segment-level deep features are output by segment-level DNN-based model 408a, and there is not a separate word-level DNN-based model 406a. Stated another way, word-level DNN-based model 406a may be a part of or replaced by segment-level DNN-based model 408a in some implementations.

Example Segmentation Mechanism

FIG. 4C is an illustration of output of a segmentation process that may be used to implement a portion of the computing system of FIG. 1. More specifically, FIG. 4C illustrates an example of segments that may be produced by the segmentation mechanism of segment-level feature generation component 408. An example implementation of a segmentation mechanism that may generate the segments shown in FIG. 4C is illustrated in FIG. 4D, described below.

In FIG. 4C, segment output 440 includes permutations of segments generated for an input text sequence. Segment output 440 is coupled to an input of segment-level DNN-based feature generation model 408a and is also coupled to an input of segment-level lexicon-based predictive model 408b. The segment-level output of segment-level DNN-based feature generation model 408a and/or segment-level lexicon-based predictive model 408b provide context information that may be used by DNN-based predictive model 412 and/or lexicon-based predictive model 408b to perform disambiguation; e.g. to resolve problems of ambiguity in the semantic interpretation of query terms.

Segment output 440 includes all possible segmentations for a particular word of an input text sequence, given certain pre-determined constraints such as maximum sentence length and maximum segment length, where sentence length and segment length each may be computed as a count of words in the sentence or segment, as the case may be. Thus, for example, if the number of words in an input text sequence exceeds the maximum sentence length, the input text sequence may be split into multiple text sequences. The maximum segment length constrains the number of segments that may be generated for a given word of the input text sequence. The use of constraints such as maximum sentence length and maximum segment length resolves the double looping problem because, since the maximum sentence length and maximum segment lengths are known, the enumeration of segments can be performed in a single loop, e.g., iteration, instead of two loops.

In the example of FIG. 4D, the maximum sentence length is set at ten and the maximum segment length is set at five. On other examples, the maximum sentence length and maximum segment length may be set to any positive integer. An input text sequence 442 includes four words, "Microsoft Java Software Engineer," but other examples could include any number of words.

Column 444 illustrates the segments of enumerated for text sequence 442, e.g., ten different segment variants, where the integers in the left-hand column 449a indicate index values, e.g., index [0], index [1], etc., assigned to the respective segments. The length of each enumerated segment is constrained by the maximum segment length but any segment may have any length up to and including the maximum segment length. Thus, segment variants can have various lengths such that the comparative lengths of any two segments may not be the same.

The segments generated for an input text sequence may be input into segment-level lexicon-based model 408b, which generates segment-level wide features. Alternatively or in addition, the segments generated for an input text sequence also be encoded by the DNN-based feature generation models 406a and/or 408a to generate a set of deep features, e.g., dense embeddings. The concatenation of the segment-level wide features and the dense embeddings makes up a dense segment feature for a particular segment variant. A special token or symbol, e.g., [CLS], may be used as an embedding representing the beginning of a particular segment. Thus, for each index value in column 444, one fixed-length dense embedding vector represents the corresponding segment variant.

Columns 446 and 448 illustrate a word-to-segment variants mapping list for a particular word of text sequence 442, e.g., word 443, Microsoft, of text sequence 442. The word-to-segment variants mapping list encodes all possible segment variants of the given word, e.g., word 443, to a list of dense segment features of the dense segment feature list of column 444. The word-to-segment variants mapping list of columns 446, 448 includes an index table for each word of text sequence 442, which maps the word to a list of segment variants indexes in column 444 while maintaining position information for each word in the text sequence 442 and the structure of the segments.

To do this, a particular index value of word-to-segment variants mapping list 446, 448 represents a specific pattern of the segment variant, e.g., <length of the segment variant>-<position of the current word inside the segment variant>, that a word may have. Using the example of FIG. 4C, if the maximum segment length is set to a value of five, a word-to-segment variants mapping list may be generated as shown by indexes 441, 447, where: [index 0] 1-0 indicates a segment length of 1 and the position of the word in the segment is index 0; [index 1]2-0 indicates a segment length of 2 and the position of the word in the segment is index 0; and [index 2] 2-1 indicates a segment length of 2 and the position of the word in the segment is index 1, and so on.

FIG. 4C also illustrates deep segment features mapping lists 449a, 449b, 449c. The index of segment variants inside a deep segment features list is assigned to each one of the specific patterns represented by the index values. For example, in FIG. 4C, mapping list 449a is a list that enumerates all possible segments inside the entire text sequence "Microsoft Java Software Engineer." As can be seen from list 449a, a segment is defined by a starting word and a segment length, where the segment length is constrained by a threshold value or upper bound. Thus, there are four segments that start with the word "Microsoft," where each segment has a length that is less than or equal to four words. Similarly, there are three segments that start with the word "Java," two segments that start with the word "Software," and one segment that starts with the word, "Engineer." In this way, one or more segments are generated for each word in the text sequence 442; that is, each word in the text sequence acts as a starting word from which one or more segments are generated.

Mapping list 449b is a list of segments that are used to create segment-level features for the particular word "Microsoft." The segments generated for the word "Microsoft" are "Microsoft," "Microsoft Java," "Microsoft Java Software," and "Microsoft Java Software Engineer." Using a DNN-based feature generation model, deep embeddings are produced for each of the segments: "Microsoft," "Microsoft Java," "Microsoft Java Software" and "Microsoft Java Software Engineer." These embeddings are concatenated and thereby constitute the segment-level features for the word "Microsoft" inside the particular text sequence "Microsoft Java Software Engineer."

At inference time, performance can be enhanced by reducing the number of times that the DNN-based feature generation model is called, using, e.g., indexing and caching. For instance, at inference time, calls may be made to DNN-based feature generation model(s) to obtain embeddings for the permutations of segments inside the text sequence 442 (in list 449a). An index is assigned to each of the segments (e.g., 0 1 2 3 . . . ). To look up the embeddings for the individual words inside the text sequence, a list of index (e.g., 449b and 449c) is used.

For example, a deep segment features mapping 449a, 449b, 449c of the word "Microsoft" may be as follows: using a pattern of L-P, where L is the segment length and P is the word position in the text sequence, assign index 0 inside the deep segment feature list to pattern 1-0 (segment length=1, starting word position=0), which represents the segment variant "Microsoft;" assign index 1 inside the deep segment feature list to pattern 2-0 (segment length=2, starting word position=0), which represents the segment variant "Microsoft Java;" assign −1 to pattern 2-1 (length=2, starting word position=1) because there isn't a segment variant that has a length of 2 with the word "Microsoft" appearing at the position of index 1, since "Microsoft" is the very first word of the query "Microsoft Java Software Engineer," and so on.

The above approach enumerates segments of an input text sequence using a brute-force method. In other embodiments, segments may be generated using a neural network based segmentation method.

Example Segment-Level Model

FIG. 4D is a schematic diagram of a portion of a multi-level machine learning model architecture that may be used to implement a portion of the computing system of FIG. 1. More specifically, FIG. 4D shows an example implementation of segment-level feature generation model 408. In the example of FIG. 4D, a segment-level model 450 generates a set of segments for each individual word of an input text sequence, and generates both deep features and wide features for each segment of each word.

In FIG. 4D, an input word 452, Learning, of a text sequence is input into segmenter 454. Segmenter 454 performs segmentation operations such as the operations described above with reference to FIG. 4C. Segmenter 454 outputs segments 456, where each segment 456 is a variant of the input word 452 that may include one or more other words of the input text sequence. In the example of FIG. 4D, segmenter 454 outputs four different segments for the input word 452. In other examples, segmenter 454 may output any number of different segments subject to any applicable constraints, which may be determined in accordance with the requirements of a particular design.

Segments 456 are input into a DNN-based feature generation model, such as model 408a, which outputs segment-level deep features 458 for the input word 452. Segments 456 are also input into a lexicon-based model, which outputs lexicon-based wide features 460 for the input word 452. The individual segment-level deep features 458 are combined using, for example, a concatenation function, to produce segment-level deep features 462 for the input word 452. The individual segment-level wide features 460 are combined using, for example, a concatenation function, to produce segment-level wide features 464 for the input word 452. A similar process is repeated for each word of the input text sequence.

Example Contextual Encoder Model

Referring to FIG. 4A, deep features generated for a particular word of an input text sequence by, for example, DNN-based feature generation models 404, 406a, 408a, are combined using, for example, a concatenation function. A combination of at least two of the character-level deep features produced by model 404, word-level features produced by model 406a (or model 408a, as noted above), and segment-level features produced by model 408a, for a particular word of the input text sequence, is input into DNN-based predictive model 412, together with similar sets of multi-level features generated for each of the other words of the input text sequence, respectively. DNN-based predictive model 412 outputs DNN-based tag prediction data as described above. DNN-based predictive model 412 may be implemented as a Bi-LSTM model, a recurrent neural network (RNN), or a transformer-based model.

Example Decoder Model

Figure 4E:
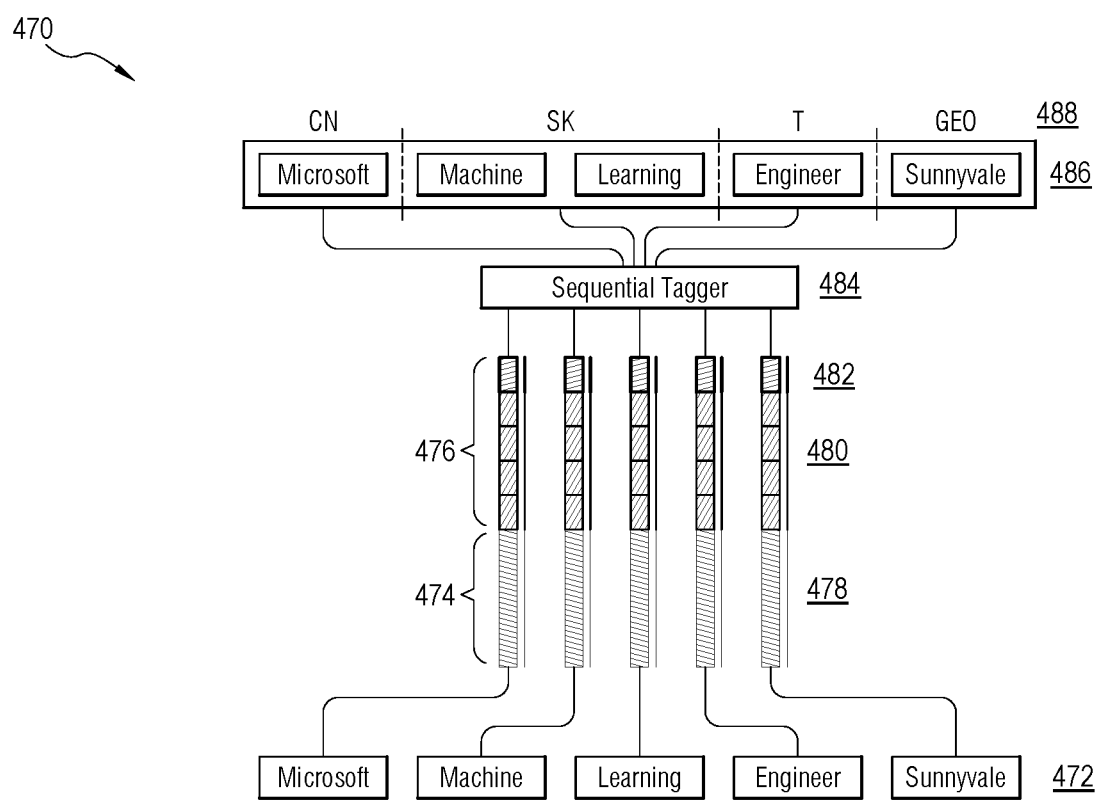
FIG. 4E is a schematic diagram of a portion of a multi-level machine learning model architecture that may be used to implement a portion of the computing system of FIG. 1.

FIG. 4E is a schematic diagram of a portion of a multi-level machine learning model architecture that may be used to implement a portion of the computing system of FIG. 1. In particular, FIG. 4E illustrates an example implementation of decoder or sequential tagger 420 of FIG. 4A.

As shown in FIG. 4E, decoder model 470 includes a sequential tagger 484. Output of DNN-based predictive model 412 and lexicon-based predictive model(s) 406b, 408b for each word of an input text sequence 472, e.g., per-word deep and wide multi-level feature sets 474, 476, are combined and input into sequential tagger 484. Sequential tagger 484 outputs a tagged version of input text sequence 472. The tagged version of input text sequence 472 includes grouped text 486 and corresponding semantic tags 488.

In the example of FIG. 4E, input text sequence 472 includes five words, but any input text sequence may have any number of words. A deep and wide multi-level feature set is created for each word of text sequence 472 using the multi-level model architecture described above. Each multi-level feature set includes a set of deep features 474 and a set of wide features 476. The set of deep features 474 includes at least one of character-level, word-level and segment-level deep features. The set of wide features 476 includes word-level wide features 482 and segment-level wide features 480.

The set of deep features 474 and the set of wide features 476 for each word are concatenated and input into sequential tagger 484. During online inferencing, sequential tagger 484 may use, for example, a JAVA-based top k decoder powered by a K-Best Viterbi A* algorithm, which may help overcome the double looping problem. Sequential tagger 484 may be implemented using, for example, a conditional random field (CRF) model, for example an entity-recognition model, such as a TENSORFLOW CRF that has been trained during an offline training stage.

During online inferencing, in one implementation, the K-Best Viterbi A* Algorithm takes a CRF transition matrix and logits as inputs, and outputs the top-k best tag predictions with their corresponding confidence scores. The top-k best tag predictions are in the form of word-tag pairs. Sequential tagger 484 uses the top-k best tag predictions to generate the grouped text 486 and associated semantic tags 488. Alternatively, sequential tagger 484 outputs the top-k tag predictions for use by a downstream application.

Example Model Training Process

Figure 5:
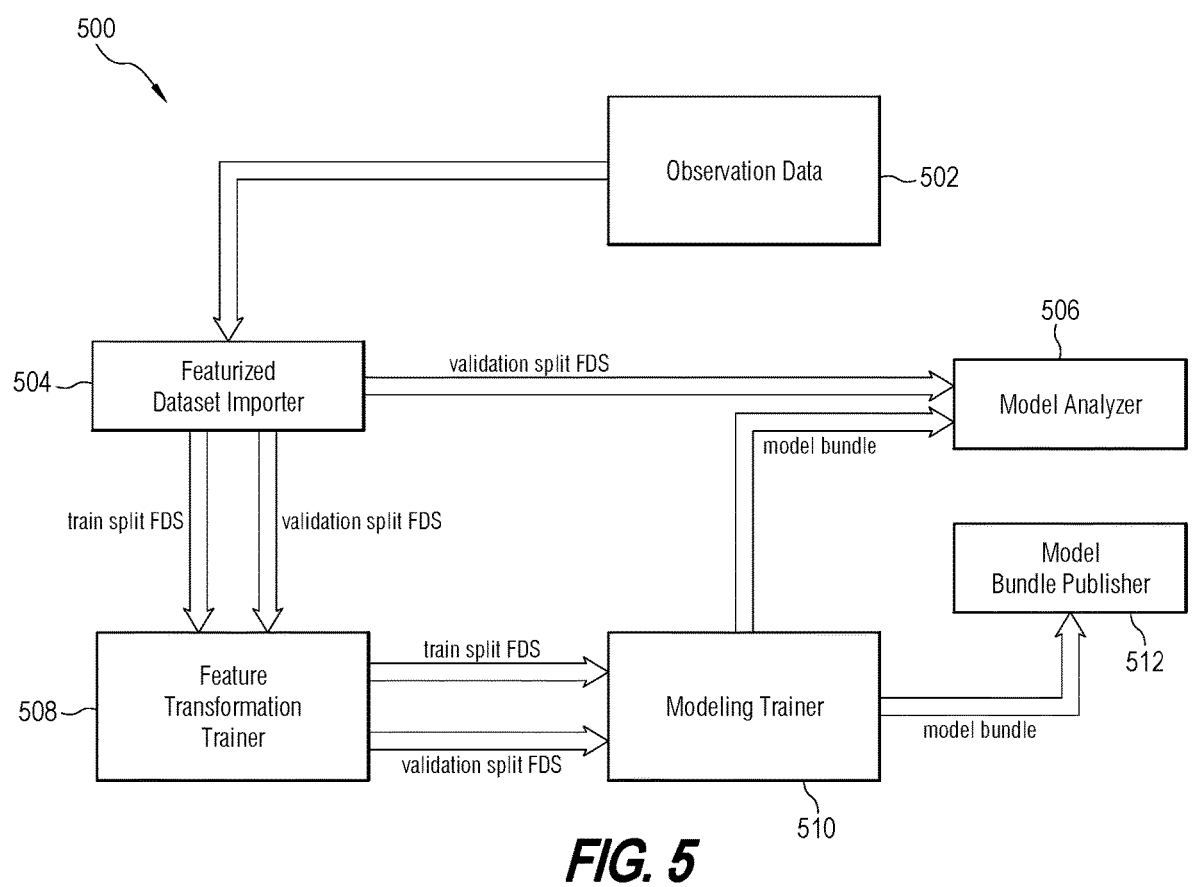
FIG. 5 is a flow diagram of a process that may be used to implement a portion of the computing system of FIG. 1.

FIG. 5 is a flow diagram of a process that may be used to implement a portion of the computing system of FIG. 1. More specifically, process 500 is an example of a process that may be used for machine learning model training and evaluation for decoder model 420. Portions of process 500 may be implemented offline so that the machine learning model-based inferencing, e.g. automated tag predictions, operations of decoder model 420 may be conducted efficiently online.

In process 500, observation data 502 is generated or obtained. An example of observation data 502 is annotated text sequences, such as human-labeled search queries collected by crowdsourcing. Observation data 502 may contain training data that is specific to a particular domain, such as job search or people search, or observation data 502 may contain training data that spans multiple different domains. Additionally, observation data 502 may contain training data for a specific human-spoken language, such as English-language queries, or observation data 502 may contain training data in multiple different languages, such as German, Spanish, Portuguese, French, and Chinese. In one implementation, observation data 502 contained in the range of about 200,000 labeled examples of training data.

Observation data 502 is divided into two datasets, where one of the datasets is used for model training and the other dataset is used for model evaluation. In one implementation, a random 90% training −10% evaluation split of observation data 502 is used, however any suitable split may be used.

Featurized dataset (FDS) importer 504 imports the two featurized datasets (FDS), i.e., training split FDS (e.g., 90% of the entire dataset) and validation split FDS (e.g., 10% of the entire dataset). The training split FDS and the validation split FDS each contain labels and wide features including lexicon data for word-level features.

Process 500 uses two model trainers, feature transformation trainer 508 and modeling trainer 510. Feature transformation trainer 508 generates deep features such as deep character-level features and deep segmentation-level features. Feature transformation trainer 508 may be implemented using, for example, a TENSORFLOW trainer.

Deep features output by feature transformation trainer 508 are input to modeling trainer 510, which trains the remaining parts of the multi-level model including the decoder model (e.g., CRF layer). A parameter server distributed training strategy may be used for the model training performed by modeling trainer 510. Modeling trainer 510 exports the trained model bundle to model analyzer 506 for performance analysis and, if performance requirements have been satisfied, to model bundle publisher 512 for operational use.

Example Hardware Architecture

According to one embodiment, the techniques described herein are implemented by at least one special-purpose computing device. The special-purpose computing device may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 6:
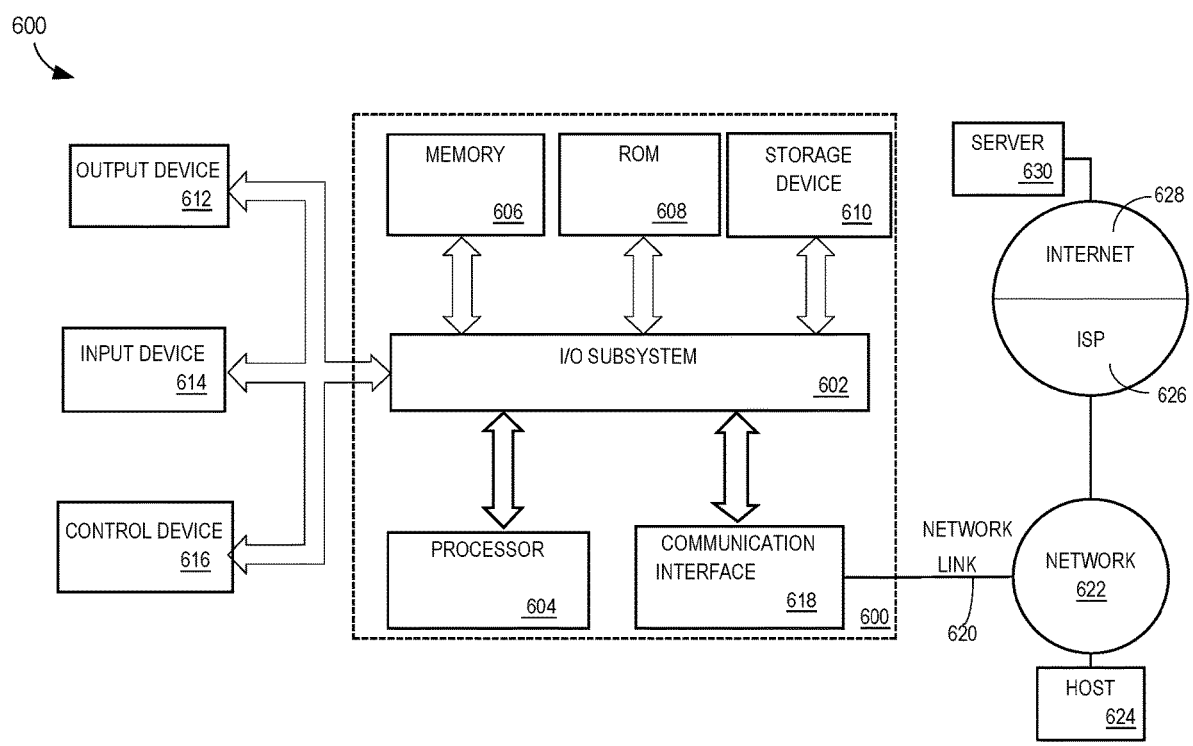
FIG. 6 is a block diagram illustrating an embodiment of a hardware system, which may be used to implement various aspects of the computing system of FIG. 1.

For example, FIG. 6 is a block diagram that illustrates a computer system 600 upon which an embodiment of the present invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory computer-readable storage media accessible to processor 604, render computer system 600 into a special-purpose machine that is customized to perform the operations specified in the instructions.

Computer system 600 and further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to an output device 612, such as a display, such as a liquid crystal display (LCD) or a touchscreen display, for displaying information to a computer user, or a speaker, a haptic device, or another form of output device. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, at least one ASIC or FPGA, firmware and/or program logic which in combination with the computer system causes or programs computer system 600 to be a special-purpose machine. According to one embodiment, the techniques herein are performed by computer system 600 in response to processor 604 executing at least one sequence of instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying at least one sequence of instruction to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated-services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through at least one network to other data devices. For example, network link 620 may provide a connection through local network 622 to a host computer 624 or to data equipment operated by an Internet Service Provider (ISP) 626. ISP 626 in turn provides data communication services through the world-wide packet data communication network commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 530 might transmit a requested code for an application program through Internet 628, ISP 626, local network 622 and communication interface 618. The received code may be executed by processor 604 as it is received, and/or stored in storage device 610, or other non-volatile storage for later execution.

Additional Examples

Illustrative examples of the technologies disclosed herein are provided below. An embodiment of the technologies may include any of the examples or a combination of the described below.

Embodiments can improve a search engine by using multi-level features to generate tags for a search query. The search query may include a text sequence, which could contain a single word or multiple words. In an example 1, a method includes, by an information retrieval system: reading a text sequence that includes at least one word; extracting model input data from the text sequence, where the model input data includes, for each word of the text sequence, segment data and non-segment data; using a first machine learning model and at least one second machine learning model, generating, for each word of the text sequence, a multi-level feature set; outputting, by a third machine learning model, in response to input to the third machine learning model of the multi-level feature set, a tagged version of the text sequence; executing a search based at least in part on the tagged version of the text sequence.

An example 2 includes the subject matter of example 1, the segment data generated by determining a text sequence length threshold and a segment length threshold, and, if a length of the text sequence is less than or equal to the text sequence length threshold, for each word of the text sequence, generating a plurality of segments of the text sequence that each are less than or equal to the segment length threshold. An example 3 includes the subject matter of example 1, the non-segment data including, for each word of the text sequence, at least one of (i) character-level data extracted from the word, (ii) word-level data extracted from the word, or (iii) any combination of (i) and (ii). An example 4 includes the subject matter of example 1, the multi-level feature set including, for each word of the text sequence, at least two different-level feature subsets; the at least two different-level feature subsets including at least one segment-level feature subset and at least one non-segment-level feature subset.

In some embodiments, the first machine learning model is a DNN that produces the segment-level features. An example 5 includes the subject matter of example 4, a segment-level feature subset of the at least two different-level feature subsets output by the first machine learning model in response to input, to the first machine learning model, of the segment data.

In some embodiments, the second ML model is a statistical model that uses a lexicon to classify either a word or a segment, or the second ML model is a word-level DNN or a character-level DNN. An example 6 includes the subject matter of example 4, at least one of the at least two different-level feature subsets output by the at least one second machine learning model in response to input, to the at least one second machine learning model, of at least one of the segment data and the non-segment data.

An example 7 includes the subject matter of example 1, the first machine learning model trained on segment training data generated by determining a text sequence length threshold and a segment length threshold, and, for segment training data having a length less than or equal to the text sequence length threshold, generating a plurality of segments of the segment training data that each are less than or equal to the segment length threshold.

In some embodiments, a sequential tagger or CRF does its own segmenting, i.e., since Machine and Learning words are both tagged as Skill, both of these words are combined under one tag. An example 8 includes the subject matter of example 1, the third machine learning model generating the tagged version of the text sequence by grouping words of the text sequence according to matching tags.

In some embodiments, the disclosed technologies are included in a tagging service that provides tags for use by a downstream application. In an example 9, a method includes, by a device operating a software-based service: determining a text sequence obtained from a software application; the text sequence including at least one word; extracting model input data from the text sequence, where the model input data includes, for each word of the text sequence, segment data and non-segment data; by a first machine learning model and at least one second machine learning model, generating a multi-level feature set in response to the model input data; outputting, by a third machine learning model, in response to input of the multi-level feature set to the third machine learning model, a tagged version of the text sequence for processing by the software application.

Some embodiments include a fourth ML model (e.g., a Contextual Bi-LSTM) that produces tag predictions from word-level, character-level, and segment-level deep features, and/or a statistical model that produces tag predictions from words and segments. An example 10 includes the subject matter of example 9, the multi-level feature set including tag prediction data; the tag prediction data output by a fourth machine learning model in response to input, to the fourth machine learning model, of output of at least one of (i) a segment-level deep neural network model, (ii) a word-level deep neural network model, (iii) a character-level deep neural network model, (iv) any combination of (i), (ii), (iii), (iv).

An example 11 includes the subject matter of example 9, the multi-level feature set including tag prediction data; the tag prediction data output by a statistical model in response to input, to the statistical model of at least one of (i) the segment data, (ii) word-level data of the non-segment data, (iii) both (i) and (ii). An example 12 includes the subject matter of example 9, the multi-level feature set including first tag prediction data and second tag prediction data; the first tag prediction data output by a fourth machine learning model in response to input, to the fourth machine learning model, of output of at least one of (i) a segment-level deep neural network model, (ii) a word-level deep neural network model, (iii) a character-level deep neural network model, (iv) any combination of (i), (ii), (iii); the second tag prediction data output by a statistical model in response to input, to the statistical model of at least one of (v) the segment data, (vi) word-level data of the non-segment data, (vii) both (v) and (vi). An example 13 includes the subject matter of example 9, the multi-level feature set including tag prediction data; the tag prediction data output by a fourth machine learning model in response to input, to the fourth machine learning model, of output of at least two of (i) a segment-level deep neural network model, (ii) a word-level deep neural network model, (iii) a character-level deep neural network model, (iv) any combination of (i), (ii), (iii). An example 14 includes the subject matter of example 9, the multi-level feature set including tag prediction data; the tag prediction data output by a statistical model in response to input, to the statistical model of the segment data and word-level data of the non-segment data. An example 15 includes the subject matter of example 9, the multi-level feature set including first tag prediction data and second tag prediction data; the first tag prediction data output by a fourth machine learning model in response to input, to the fourth machine learning model, of output of a segment-level deep neural network model and output of a word-level deep neural network model and output of a character-level deep neural network model; the second tag prediction data output by a statistical model in response to input, to the statistical model of the segment data and word-level data of the non-segment data.

Some embodiments include a model architecture for generating a multi-level feature set, which can be input into, for example, a sequential tagger.

In an example 16, a system includes: at least one processor; at least one computer memory operably coupled to the at least one processor; the at least one computer memory configured according to a multi-level model; the multi-level model including a first machine learning model; the first machine learning model including a deep neural network trained on segment training data; the segment training data generated by determining a text sequence length threshold and a segment length threshold, and, for text sequence training data having a length less than or equal to the text sequence length threshold, generating a plurality of segments of the text sequence training data that each are less than or equal to the segment length threshold.

In some embodiments, the multi-level model architecture includes a statistical model that produces wide features. An example 17 includes the subject matter of example 16, the multi-level model further including at least one second machine learning model; a second machine learning model of the at least one second machine learning model including a statistical model configured to be communicatively coupled to a pre-determined lexicon.

In some embodiments, the statistical model can take segments as input instead of words. An example 18 includes the subject matter of example 17, an input of the statistical model capable of being communicatively coupled to an output of a segmentation mechanism; the segmentation mechanism capable of generating segment data from a text sequence by determining a text sequence length threshold and a segment length threshold, and, if the text sequence has a length that is less than or equal to the text sequence length threshold, generating a plurality of segments of the text sequence that each are less than or equal to the segment length threshold.

In some embodiments, the multi-level model architecture also includes a word-level DNN and/or a character-level DNN. An example 19 includes the subject matter of example 17, the at least one second machine learning model further including at least one deep neural network trained on non-segment data; the non-segment data including at least one of word-level data extracted from the text sequence training data and character-level data extracted from the text sequence training data.

In some embodiments, the multi-level model architecture includes a contextual Bi-LSTM for processing deep features. An example 20 includes the subject matter of example 19, the multi-level model further including a third machine learning model; an input of the third machine learning model configured to be communicatively coupled to an output of the first machine learning model and an output of the at least one deep neural network trained on non-segment data.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

Terms such as "computer-generated" and "computer-selected" as may be used herein may refer to a result of an execution of one or more computer program instructions by one or more processors of, for example, a server computer, a network of server computers, a client computer, or a combination of a client computer and a server computer.

As used here, "online" may refer to a particular characteristic of a connections network-based system. For example, many connections network-based systems are accessible to users via a connection to a public network, such as the Internet. However, certain operations may be performed while an "online" system is in an offline state. As such, reference to a system as an "online" system does not imply that such a system is always online or that the system needs to be online in order for the disclosed technologies to be operable.

As used herein the terms "include" and "comprise" (and variations of those terms, such as "including," "includes," "comprising," "comprises," "comprised" and the like) are intended to be inclusive and are not intended to exclude further features, components, integers or steps.

Various features of the disclosure have been described using process steps. The functionality/processing of a given process step potentially could be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features mentioned or evident from the text or drawings. These different combinations constitute various alternative aspects of the embodiments.

What is claimed is:

1. A method comprising, by an information retrieval system:
    reading a text sequence that comprises at least one word;
    extracting model input data from the text sequence, wherein the model input data comprises, for each word of the text sequence, segment data and non-segment data, wherein the segment data is generated by determining a text sequence length threshold and a segment length threshold different from the text sequence length threshold, and, if a length of the text sequence is less than or equal to the text sequence length threshold, for each word of the text sequence, generating a plurality of segments of the text sequence that each are less than or equal to the segment length threshold;

using a first machine learning model generating, for each word of the text sequence, based on the model input data, a first feature subset of a multi-level feature set;

using a second machine learning model generating, for each word of the text sequence, based on the model input data, a second feature subset of the multi-level feature set;

outputting, by a third machine learning model, in response to input to the third machine learning model of the multi-level feature set, a tagged version of the text sequence;

executing a search based at least in part on the tagged version of the text sequence.

2. The method of claim 1, wherein the non-segment data comprises, for each word of the text sequence, at least one of (i) character-level data extracted from the word, (ii) word-level data extracted from the word, or (iii) any combination of (i) and (ii).

3. The method of claim 1, wherein the multi-level feature set comprises, for each word of the text sequence, the first feature subset comprising at least one segment-level feature subset and at least the second feature subset comprising one non-segment-level feature subset.

4. The method of claim 3, wherein a segment-level feature subset of the multi-level feature set is output by the first machine learning model in response to input to the first machine learning model, of the segment data.

5. The method of claim 3, wherein a non-segment-level feature subset of the multi-level feature set is output by the second machine learning model in response to input, to the second machine learning model, of at least one of the segment data and the non-segment data.

6. The method of claim 1, wherein the first machine learning model is trained on segment training data generated by determining a text sequence length threshold and a segment length threshold, and, for segment training data having a length less than or equal to the text sequence length threshold, generating a plurality of segments of the segment training data that each are less than or equal to the segment length threshold.

7. The method of claim 1, wherein the third machine learning model is generating the tagged version of the text sequence by grouping words of the text sequence according to matching tags.

8. A method comprising, by a device operating a software-based service:

determining a text sequence obtained from a software application;

the text sequence comprising at least one word;

extracting model input data from the text sequence, wherein the model input data comprises, for each word of the text sequence, segment data and non-segment data, wherein the segment data is generated by determining a text sequence length threshold and a segment length threshold different from the text sequence length threshold, and, if a length of the text sequence is less than or equal to the text sequence length threshold, for each word of the text sequence, generating a plurality of segments of the text sequence that each are less than or equal to the segment length threshold;

by a first machine learning model, generating, in response to input of the model input data to the first machine learning model, for each word of the text sequence, a first feature subset of a multi-level feature subset;

by a second machine learning model, generating, in response to input of the model input data to the second machine learning model, for each word of the text sequence, a second feature set of the multi-level feature set;

outputting, by a third machine learning model, in response to input of the multi-level feature set to the third machine learning model, a tagged version of the text sequence for processing by the software application.

9. The method of claim 8, wherein the multi-level feature set comprises tag prediction data; the tag prediction data output by a fourth machine learning model in response to input to the fourth machine learning model, of output of at least one of (i) a segment-level deep neural network model, (ii) a word-level deep neural network model, (iii) a character-level deep neural network model, (iv) any combination of (i), (ii), (iii), (iv).

10. The method of claim 8, wherein the multi-level feature set comprises tag prediction data; the tag prediction data output by a statistical model in response to input, to the statistical model of at least one of (i) the segment data, (ii) word-level data of the non-segment data, (iii) both (i) and (ii).

11. The method of claim 8, wherein the multi-level feature set comprises first tag prediction data and second tag prediction data; the first tag prediction data output by a fourth machine learning model in response to input, to the fourth machine learning model, of output of at least one of (i) a segment-level deep neural network model, (ii) a word-level deep neural network model, (iii) a character-level deep neural network model, (iv) any combination of (i), (ii), (iii); the second tag prediction data output by a statistical model in response to input, to the statistical model of at least one of (v) the segment data, (vi) word-level data of the non-segment data, (vii) both (v) and (vi).

12. The method of claim 8, wherein the multi-level feature set comprises tag prediction data; the tag prediction data output by a fourth machine learning model in response to input, to the fourth machine learning model, of output of at least two of (i) a segment-level deep neural network model, (ii) a word-level deep neural network model, (iii) a character-level deep neural network model, (iv) any combination of (i), (ii), (iii).

13. The method of claim 8, wherein the multi-level feature set comprises tag prediction data; the tag prediction data output by a statistical model in response to input, to the statistical model of the segment data and word-level data of the non-segment data.

14. The method of claim 8, wherein the multi-level feature set comprises first tag prediction data and second tag prediction data; the first tag prediction data output by a fourth machine learning model in response to input, to the fourth machine learning model, of output of a segment-level deep neural network model and output of a word-level deep neural network model and output of a character-level deep neural network model; the second tag prediction data output by a statistical model in response to input, to the statistical model of the segment data and word-level data of the non-segment data.

15. A system, comprising:
at least one processor;
at least one computer memory operably coupled to the at least one processor;
the at least one computer memory configured according to a multi-level model;

the multi-level model comprising a first machine learning model to generate, for each word of a text sequence, a segment-level feature set of a multi-level feature set and a model to generate, for each word of the text sequence, a non-segment level feature set of the multi-level feature set;

the first machine learning model comprising a deep neural network trained on segment training data;

the segment training data generated by determining a text sequence length threshold and a segment length threshold different from the text sequence length threshold, and, for text sequence training data having a length less than or equal to the text sequence length threshold, generating a plurality of segments of the text sequence training data that each are less than or equal to the segment length threshold.

16. The system of claim 15, wherein the model of the multi-level model comprises a statistical model configured to be communicatively coupled to a pre-determined lexicon.

17. The system of claim 16, an input of the statistical model capable of being communicatively coupled to an output of a segmentation mechanism; the segmentation mechanism capable of generating segment data from the text sequence by determining a text sequence length threshold and a segment length threshold, and, if the text sequence has a length that is less than or equal to the text sequence length threshold, generating a plurality of segments of the text sequence that each are less than or equal to the segment length threshold.

18. The system of claim 16, wherein the model of the multi-level model comprises at least one deep neural network trained on non-segment data; the non-segment data comprising at least one of word-level data extracted from the text sequence training data and character-level data extracted from the text sequence training data.

19. The system of claim 18, wherein the multi-level model further comprises a third machine learning model; an input of the third machine learning model configured to be communicatively coupled to an output of the first machine learning model and an output of the at least one deep neural network trained on non-segment data.

* * * * *